US012650705B2

(12) United States Patent
Selby et al.

(10) Patent No.: US 12,650,705 B2
(45) Date of Patent: Jun. 9, 2026

(54) ON-DEVICE LOW POWER, RAPID RESPONSE HEATERS FOR DEVICE CALIBRATION PROCESSES

(71) Applicant: Texas Instruments Incorporated, Dallas, TX (US)

(72) Inventors: Ryan Wade Selby, Tucson, AZ (US); Shobha Subramanian, Richardson, TX (US); Hussain Attarwala, McKinney, TX (US); Keith Eric Sanborn, Tucson, AZ (US); Mihail Gurevitch, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1042 days.

(21) Appl. No.: 17/395,680

(22) Filed: Aug. 6, 2021

(65) Prior Publication Data

US 2022/0382304 A1     Dec. 1, 2022

Related U.S. Application Data

(60) Provisional application No. 63/194,705, filed on May 28, 2021.

(51) Int. Cl.
| | |
|---|---|
| *H05B 3/00* | (2006.01) |
| *G05D 22/02* | (2006.01) |
| *G05D 23/20* | (2006.01) |
| *H05B 1/02* | (2006.01) |

(52) U.S. Cl.
CPC ............. *G05D 23/20* (2013.01); *G05D 22/02* (2013.01); *H05B 1/02* (2013.01); *H05B 3/0019* (2013.01); *H05B 2203/007* (2013.01)

(58) Field of Classification Search
CPC ...... H05B 1/0233; H05B 1/02; H05B 1/0202; H05B 1/023; H05B 2203/007; H05B 3/0019
USPC ................................. 219/497, 501, 505, 510
See application file for complete search history.

(56) References Cited

U.S. PATENT DOCUMENTS

| | | | | |
|---|---|---|---|---|
| 5,688,422 | A | * | 11/1997 | Landwehr ............... A47J 37/00 236/46 F |
| 10,147,721 | B1 | * | 12/2018 | Gada ...................... G11C 29/24 |
| 10,666,279 | B1 | * | 5/2020 | Schurmann ......... H03M 1/1023 |
| 2007/0216468 | A1 | * | 9/2007 | Duarte ..................... G01K 7/01 702/132 |

(Continued)

*Primary Examiner* — Chris Q Liu
(74) *Attorney, Agent, or Firm* — Xianghui Huang; Frank D. Cimino

(57) ABSTRACT

Various examples are provided of low power, rapid response on-device heaters and methods of calibrating the device within a linear operating region, which is reached and maintained through control of the on-device heater. A system to be calibrated includes a sensor to measure the temperature and relative humidity of the system, a heater coupled to the sensor, a heater controller coupled to the heater to control the heater to heat the system, and a processor coupled to the sensor and the heater controller. The processor controls the heater based on temperature measured by the sensor to perform a calibration process for the system including calculating a calibration factor, and to determine whether to abort the calibration process based on relative humidity measured by the sensor indicating that the system is outside the linear operating region.

20 Claims, 5 Drawing Sheets

(56)          References Cited

U.S. PATENT DOCUMENTS

| | | | | |
|---|---|---|---|---|
| 2008/0001615 | A1* | 1/2008 | Lim | G01K 15/00 |
| | | | | 324/750.06 |
| 2011/0096809 | A1* | 4/2011 | Campos | G01K 7/01 |
| | | | | 374/178 |
| 2011/0114627 | A1* | 5/2011 | Burt | F24C 7/087 |
| | | | | 219/506 |
| 2013/0169297 | A1* | 7/2013 | Pilz | G01R 27/08 |
| | | | | 324/713 |
| 2014/0324233 | A1* | 10/2014 | Takakura | G05D 7/0635 |
| | | | | 700/281 |
| 2015/0022225 | A1* | 1/2015 | Onimaru | G01R 19/0092 |
| | | | | 324/713 |
| 2015/0215992 | A1* | 7/2015 | Lopez | H05B 1/0227 |
| | | | | 219/486 |
| 2018/0100774 | A1* | 4/2018 | Singh | G01K 7/01 |
| 2019/0165564 | A1* | 5/2019 | Fuseya | H02H 5/047 |
| 2019/0195820 | A1* | 6/2019 | Fornasari | G01N 27/223 |

* cited by examiner

400

402 — BEGIN CALIBRATION

404 — SAMPLE AMBIENT
DEVICE TEMPERATURE

406

EXCESSIVELY
COLD AMBIENT TEMPERATURE
?                                    YES

NO

EXCESSIVELY
HOT AMBIENT TEMPERATURE
?                                    YES

408                                  NO

EXCESSIVELY
LOW AMBIENT RELATIVE
HUMIDITY?                            YES

EXIT    320

412                                  NO

TO OPERATION
302 (FIG. 3A)

ON-DEVICE LOW POWER, RAPID RESPONSE HEATERS FOR DEVICE CALIBRATION PROCESSES

CROSS-REFERENCE TO RELATED APPLICATION

This application claims priority on U.S. provisional application No. 63/194,705, entitled "System/Algorithm for an On-chip Heater to Minimize Power Consumption and Response Time", filed May 28, 2021, the content of which is incorporated by reference herein in its entirety.

FIELD OF DISCLOSURE

This disclosure relates generally to devices and methods in which on-device heaters are used in calibration processes for the device, and more particularly to devices and methods in which the on-device heaters are configured and controlled to consume low power and provide rapid response to improve accuracy of the calibration processes and reliability of the results.

BACKGROUND

An on-device (or on-chip) heater may be used in connection with performing a calibration process for a device such as a sensor. The on-device heater is used to raise the temperature of the sensor so that the calibration process can be performed. Lack of efficient control of the on-device heater leads to significant and undesirable power consumption. Setting the heating time and power of the on-device heater to fixed values is generally inefficient. Such approach is also not effective in rapidly reaching and maintaining a target temperature range. As a result, the calibration process is subject to inaccuracies. A better solution to these issues is desirable.

SUMMARY

In accordance with an example, a system comprises a sensor configured to measure the temperature and relative humidity of the system; a heater coupled to the sensor; a heater controller coupled to the heater to control the heater to heat the system; and a processor coupled to the sensor and the heater controller, the processor configured to: control the heater based on temperature measured by the sensor, to perform a calibration process for the system including calculating a calibration factor, and to determine whether to abort the calibration process based on relative humidity measured by the sensor.

In accordance with an example, a method comprises activating a heater in contact with a device; setting first and second programmable variables representing heater response time and heater power consumption, respectively; measuring temperature and relative humidity of the device; comparing the measured relative humidity to a boundary condition when the measured temperature is within a target temperature range; and determining whether or not to perform a calibration process on the device based on the comparing operation.

These and other features will be better understood from the following detailed description with reference to the accompanying drawings.

BRIEF DESCRIPTION OF THE DRAWINGS

Features of the disclosure may be understood from the following figures taken in conjunction with the detailed description.

The same reference numbers are used in the drawings to designate the same or similar (structurally and/or functionally) features.

DETAILED DESCRIPTION

Figure 1:
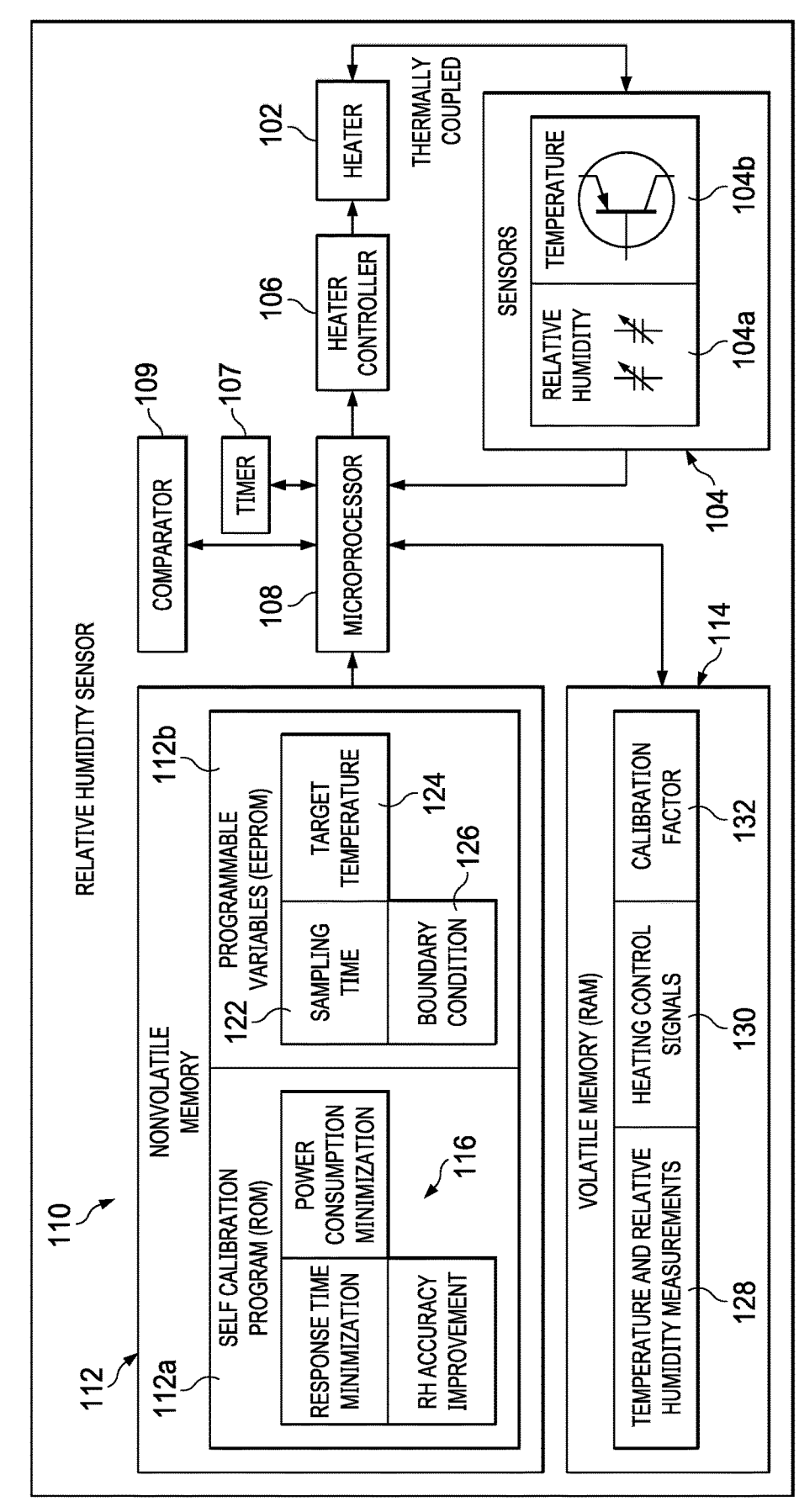
FIG. 1 is a schematic and block diagram of an example humidity sensor.

Specific examples are described below in detail with reference to the accompanying figures. These examples are not intended to be limiting. In the drawings, corresponding numerals and symbols generally refer to corresponding parts unless otherwise indicated. The objects depicted in the drawings are not necessarily drawn to scale.

In example arrangements, the time during which an on-device heater (e.g., a heater on a humidity sensor) is active is controlled to reduce or minimize power consumption. In an example, the heating power to the on-device heater is controlled to improve its responsiveness in reaching and stably maintaining a target temperature of the device, where the target temperature may be within a target temperature range. In an example, heating power to the on-device heater is controlled to reach and maintain the target temperature in less time than without control of the heating power, e.g., a minimum amount of time.

In some examples, a system (e.g., a sensor device) employs digital control to measure the temperature of the system and individually adjust heating elements of the on-device heater based on such measurement to rapidly and accurately achieve a target temperature. The on-device heater may be finely adjusted to limit power consumption and reduce the time it takes to reach a target temperature or temperature range. In an example, the system may include an array of heating elements, e.g., resistors, to implement the on-device heater, a timer (e.g., a programmable timer) to measure time between successive temperature measurements, a temperature sensor (e.g., a programmable temperature sensor) to measure temperature of the system, a non-volatile memory to store a boundary condition, a processor to perform a self-calibration process for the system, including comparing the boundary condition to a relative humidity measurement to determine whether the system is in a linear operating region where the self-calibration process may be more accurately performed. The self-calibration process may sometimes be referred to simply as a calibration process.

In an example, the calibration process may be implemented as a set of instructions (e.g., software) that is executed by the processor to run the calibration process. In an example, digital circuitry such as application specific integrated circuits (ASICs) may be employed instead of, or in addition to, a processor to run the calibration process. In an example, the calibration process for the system or device is aborted when it is detected that the system or device is outside of its linear operating region.

FIG. 1 is a schematic and block diagram of an example system 100. System 100 may be implemented as an integrated circuit on a single piece of semiconductor material (e.g., as a chip). System 100 includes a heater 102, which may be embodied as part of system 100, e.g., implemented on the same semiconductor material, or mounted on system 100.

Heater 102 is coupled to a sensor 104, which may include a relative humidity sensor 104a and a temperature sensor 104b. One or both of sensors 104a and 104b may be physically implemented in silicon in a chip implementation of system 100. The coupling between heater 102 and sensor 104 may be a thermal coupling through silicon in such a chip implementation. Other types of couplings are possible. Heater 102 is also coupled to a heater controller 106. Heater controller 106 provides control signals to heater 102 in response to instructions from a processor 108 to heat system 100 to a temperature within a target temperature range and maintain the temperature of the system within the target temperature range. In addition to being coupled to heater controller 106, processor 108 is also coupled to sensor 104 to receive relative humidity and temperature measurements made by relative humidity sensor 104a and temperature sensor 104b. Processor 108 is configured to deliver instructions to heater controller 106 based on such measurements. Processor 108 may also be configured to run or perform a calibration process for system 100. To that end, processor 108 is coupled to a timer 107 and a comparator 109. Under control of processor 108, timer 107 may be used to measure time between successive temperature measurements, and comparator 109 may be used to compare the boundary condition to a relative humidity measurement to determine whether system 100 is in a linear operating region.

In an example, processor 108 is an embedded microprocessor. Other processor implementations are possible.

System 100 also includes a memory 110. In an example, memory 110 includes a nonvolatile memory 112 and a volatile memory 114, the latter of which may be random-access-memory (RAM). Nonvolatile memory 112 may be subdivided into a read-only-memory (ROM) 112a and an electrically erasable programmable ROM (EEPROM) 112b.

Various programmable parameters used in the calibration process may be stored in nonvolatile memory 112, as well as a program 116 for executing the calibration process. Program 116 may be stored in ROM 112a. Built in to the structure of program 116 are features for response time minimization, power consumption minimization, and relative humidity (RH) accuracy improvement. In an example, sampling time 122, which is a programmable time interval between temperature measurements, a programmable target temperature 124, which may be a target temperature range, and a boundary condition 126 may be stored in EEPROM 112b. Boundary condition 126 may represent the lowest relative humidity at which the calibration process may be accurately performed or the lowest relative humidity within the linear operating region that is deemed acceptable to calculate the calibration factor. These parameters may be retrieved by processor 108, which is coupled to nonvolatile memory 112.

Volatile memory 114 may be bidirectionally coupled to processor 108. Volatile memory 114 may store relative humidity and temperature measurements 128 made by sensors 104a and 104b, respectively. Such measurements may be transmitted, e.g., fed back, to processor 108, which stores the measurements in volatile memory 114. Heating control signals 130 may also be stored in volatile memory 114. Heating control signals 118 may be retrieved by processor 108 and transmitted to heater controller 106 as part of the instructions delivered by processor 108 to heater controller 106. Volatile memory 114 may also store a current calibration factor 132 that is updated or recalculated as part of the overall calibration process for system 100.

Figure 2:
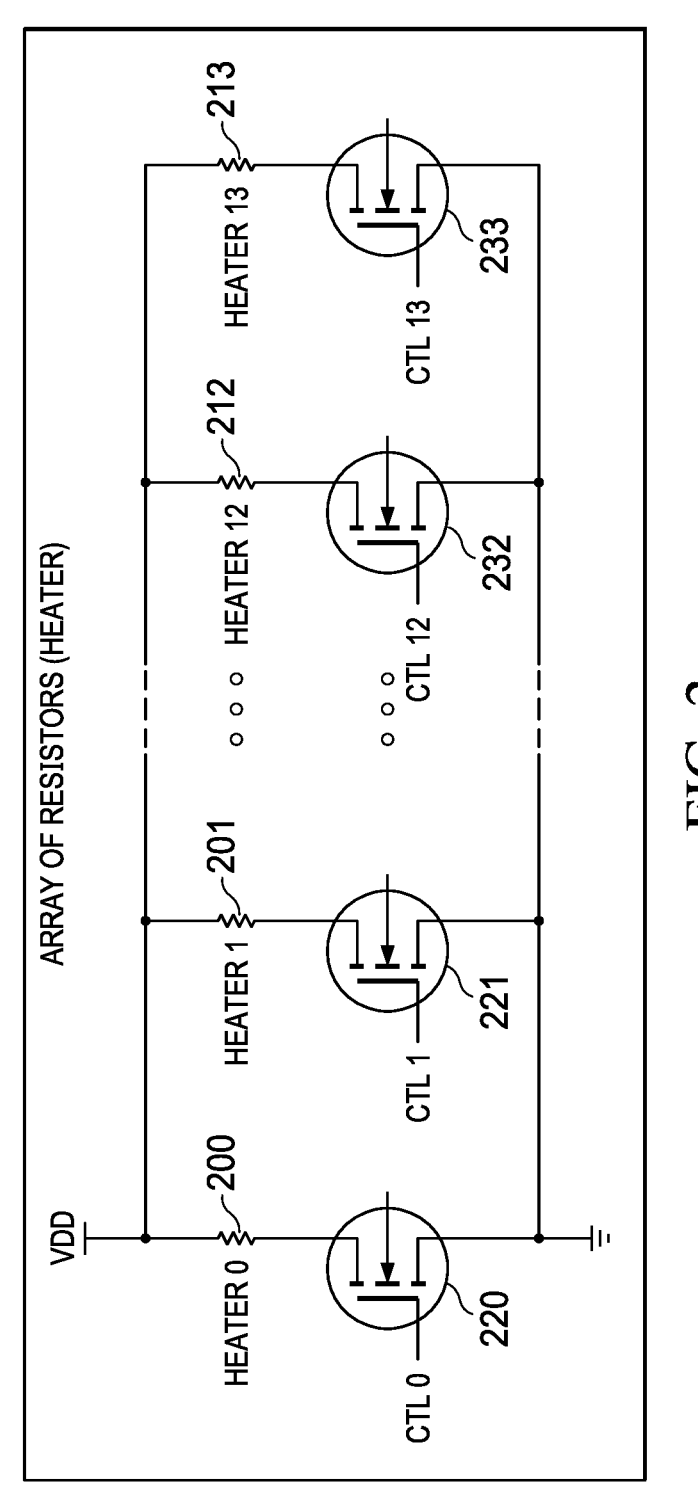
FIG. 2 is a circuit diagram of an example heater of the example humidity sensor.

FIG. 2 is a circuit diagram of example heater 102. In an example, heater 102 is configured as an array of resistive or heating elements, e.g., resistors, 200-213, also identified as Heater 0-Heater 13. Although shown as a single resistor, each resistive element may comprise one or more resistors, in which all resistors of a given resistive element are controlled as a unit. Also, in other examples, the number of resistive or heating elements may be more or less than fourteen. In an example, resistive elements 200-213 are controlled by switches 220-233, respectively.

Each of switches 220 through 233 may be implemented as an n-type metal-oxide-silicon field effect transistor (MOSFET), although other types of transistors configured to perform the desired switching function may be used instead. In an example, one terminal of each of resistive element 200-213 is coupled to a common node that is also coupled to a voltage supply (VDD). The other terminal of each resistive element 200-213 is coupled to the drain terminal of corresponding switch 220-233. The sources of switches 220-233 are commonly coupled to ground.

Resistive elements 200-213 are controlled by control signals CTL 0-CTL 13, respectively, which are applied to the gates of switches 220-233, respectively. Heater controller 106 controls application of control signals CTL 0-CTL 13 based on instructions from processor 108. That is, each of resistive elements 200-213 is individually controlled to decrease overall power consumption of heater 102, as well as to decrease the time it takes for heater 102 to heat system 100 to a stable temperature within a target temperature range.

Figures 3A, 3B:
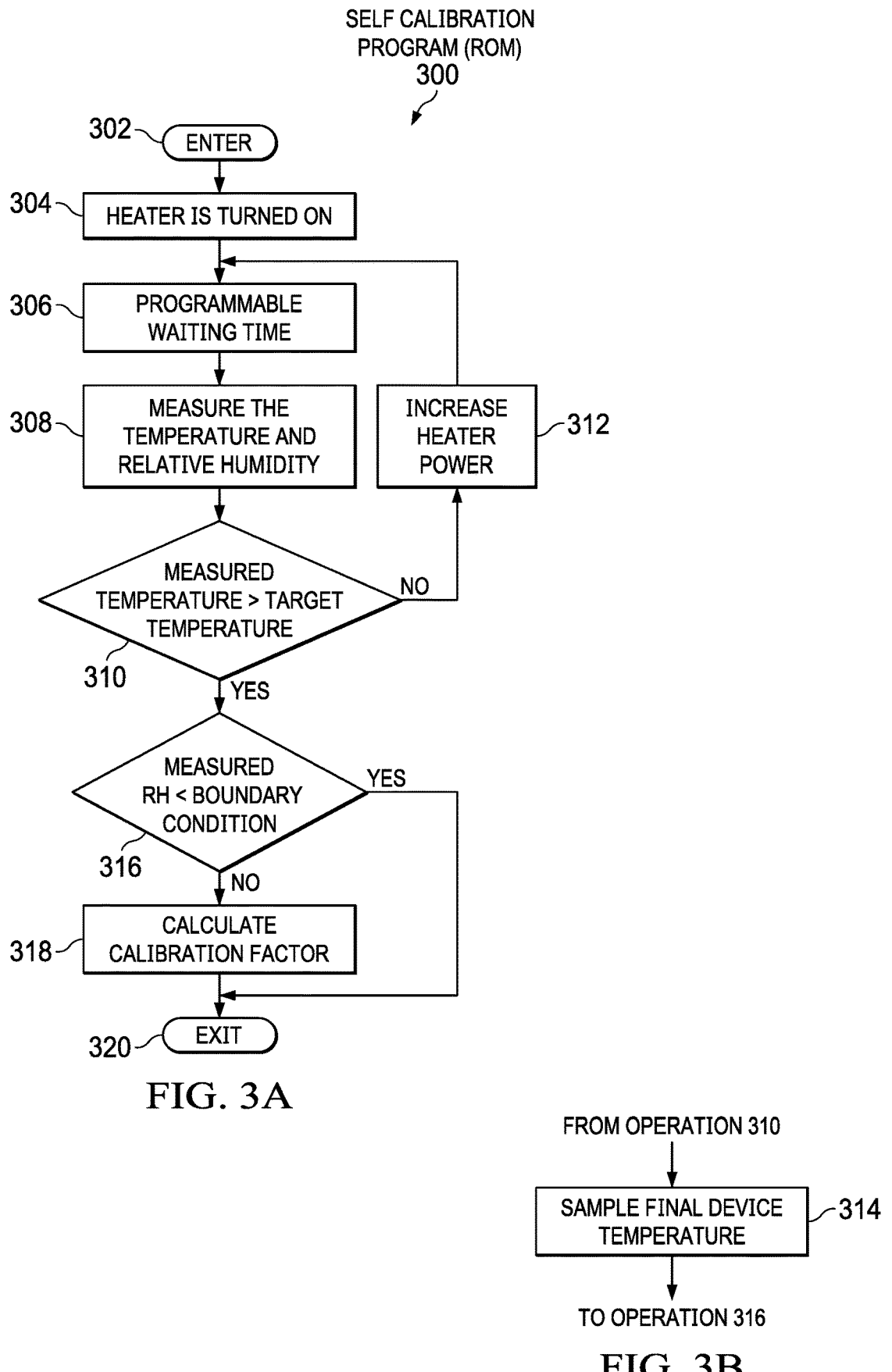
FIG. 3A is a flow diagram of an example calibration process performed by a device, e.g., example relative humidity sensor.
FIG. 3B shows a modification to the example calibration process shown in FIG. 3A.

FIG. 3A is a flow diagram 300 of an example calibration process performed by system 100. Instructions for carrying out the calibration process may be implemented in software (e.g., as program 116) stored in ROM portion 112 a of nonvolatile memory 112. Initially, when system 100 enters the main portion of the calibration process at operation 302, the program may be loaded into volatile memory 114 for execution by processor 108. In operation 304, heater 102 is turned on, e.g., by heater controller 106, based on instructions from processor 108, which indicates how many of resistive elements 200-213 to activate initially. How many resistive elements 200-213 are activated initially may be based on one or more temperature measurements made prior to operation 304, as described in connection with FIG. 4.

In operation 306, a programmable waiting time for heater 102 to respond is set. Such waiting time is set to enable heater 102 to rapidly heat system 100 to a target temperature, which may be a target temperature range. In an example, the programmable waiting time is set to minimize heating time to reach and maintain a stable temperature within a target temperature range.

In operation 308, after the waiting time has elapsed, the temperature and relative humidity of system 100 are measured, e.g., by sensor 104. For efficient use of resistive elements 200-213 in heater 102, the measured temperature is then compared with a target temperature in operation 310. In operation 312, heater power is increased when the comparison indicates that temperature of system 100, as indicated by the measured temperature, has not reached the target temperature ("no" to the determination of operation 310). The power of heater 102 may be increased by activating one or more additional resistive elements 200-213. For example, if two resistive elements, e.g., resistive elements 200 and 201, were activated at initial heater turn-on (operation 304), at operation 312 one additional resistive element, e.g., resistive element 202, may be activated.

After heater power is increased, the process reenters the waiting period previously set in operation 306. After the waiting time has elapsed, the process continues with operation 308 and the comparison of operation 310. This loop of operations 306, 308, 310 and 312 continues for N iterations with one or more additional resistive elements 200-213 being activated at each iteration until the comparison in operation 312 indicates that the temperature of system 100 is greater than the target temperature ("yes" to the determination of operation 310). The elapsed time of each iteration may be the programmable time interval between temperature measurements, which time interval may be measured by timer 107. A slight overshoot in temperature within an acceptable temperature range may compensate for some cooling that may occur prior to calculating a calibration factor, or updating the value of the existing calibration factor.

The temperature of system 100 may be measured a final time in operation 314, if desired, as indicated in FIG. 3B.

In operation 316, the relative humidity of system 100, measured in operation 308, is compared with a boundary condition to determine whether system 100 is in a linear or nonlinear operation region. Such comparison may be performed by comparator 109. In an example, the boundary condition may represent the lowest relative humidity of the linear operating region of system 100, or the lowest relative humidity within the linear operating region that is deemed acceptable to calculate the calibration factor. The boundary condition may vary depending on the particular system and error tolerance of the calibration process. More generally, the boundary condition is set to avoid performing what would likely be an inaccurate calibration. If the measured relative humidity is too low, i.e., less than the boundary condition ("yes" to the determination of operation 316), system 100 is deemed to be in a nonlinear operating region, in which case the calibration process is aborted and the process ends 320. However, if the measured relative humidity is greater than or equal to the boundary condition ("no" to the determination of operation 316), the calibration factor is calculated in operation 318, and the process ends 320.

Figure 4:
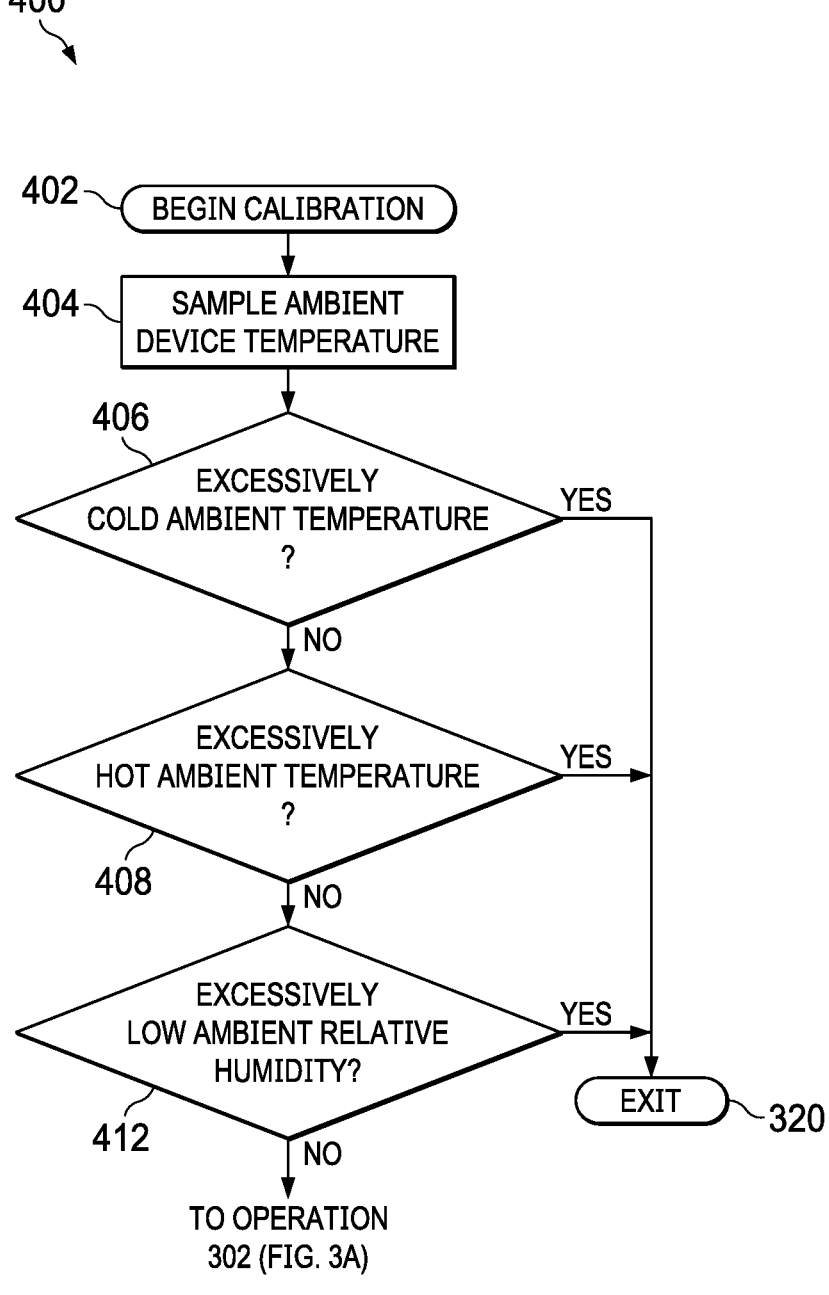
FIG. 4 is a flow diagram of example front-end operations performed as part of an example overall self-calibration process.

FIG. 4 is a flow diagram of example front-end operations 400 that may be performed as part of an example overall calibration process 300 and 400. The overall calibration process begins at 402, and at operation 404 the ambient temperature of system 100 is sampled, i.e., measured, one or more times. Based on the measured temperature, which may be an average of multiple samplings, it is determined in operation 406 whether the ambient temperature is excessively cold, and if so, the calibration process is terminated (Exit 320). The temperature with which the measured temperature is compared in operation 406 may be set to avoid a lengthy heating process considering the particular configuration of heater 102, the material composition of system 100 and its target temperature.

If the ambient temperature is not excessively cold (no to the decision of operation 406), it is determined in operation 408 whether the ambient temperature is excessively hot, and if so, the calibration process is terminated (Exit 320). The temperature with which the measured temperature is compared in operation 408 may represent an upper temperature limit at which calibration of system 100 may be successfully performed.

If the ambient temperature is neither excessively cold nor excessively hot, it is determined in operation 412 via a relative humidity measurement of system 100, whether the ambient relative humidity is excessively low, such that the calibration may take longer than is permitted under the circumstances. If so, the calibration process is terminated (Exit 320). If not, the calibration process proceeds to operation 302 of FIG. 3A. The sampled temperature measurement (s) made in operation 404 may be used in operation 304 to determine how many resistive elements, e.g., heaters, to activate.

Figure 5:
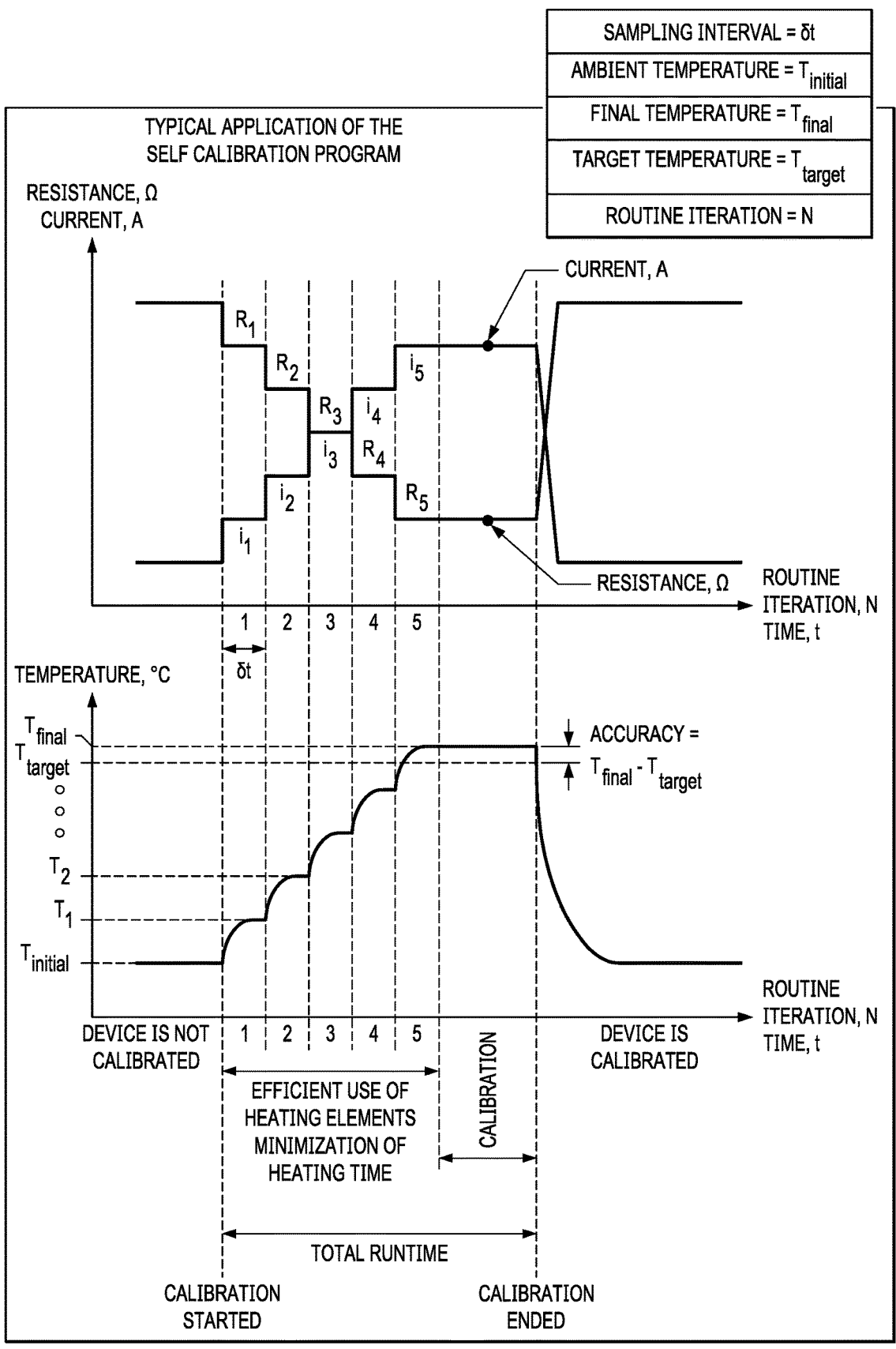
FIG. 5 shows graphs of resistance and current with respect to time and temperature of a device undergoing an example calibration process with respect to time.

FIG. 5 show graphs of resistance (resistive elements activated) and current of heater 102 with respect to time, and temperature of a device (e.g., system 100) undergoing an example calibration process with respect to time. Starting from an initial temperature measurement ($T_{initial}$), which may be obtained in operation 404 and which is below the target temperature, a base level of current in heater 102 is controlled to successively activate one or more resistive elements 200-213 to rapidly and efficiently elevate the temperature of system 100 to the target temperature through N iterations of heater control loop (e.g., operations 306, 308, 310 and 312), where, in an example N=5. The time it takes to execute one iteration represents the temperature sampling interval ($\delta t$). The base level of current in heater 102 may be the level of leakage and/or transient current in the off or standby state.

Based on $T_{initial}$, in a first iteration 1 of operation 312, heater 102 may be controlled to increase the current in heater 102 from the base level to a first level $i_1$ which corresponds to activating a certain number of the resistive elements represented by $R_1$. For example, CTL_0 may be applied to switch 220 to cause current $i_1$ to flow through resistive element 200 represented by $R_1$. This results in increasing the temperature of system 100 from $T_{initial}$ to a first temperature $T_1$, as the next temperature sampling indicates. Since $T_1$ is still below the target temperature, a second iteration 2 of operation 312 is performed in which heater 102 may be controlled to further increase the current to a second level $i_2$. This may be done, for example, by additionally applying CTL_1 to switch 221 to activate it and cause current to flow through resistive element 201, where $i_2$ is the total current flowing through resistive elements 200 and 201, collectively represented by $R_2$. This results in increasing the temperature of system 100 to a second temperature $T_2$, as indicated by the next temperature sampling.

In the illustrated example, the iterations continue up to a fifth iteration 5 of operation 312 in which the current in heater 102 is increased to a fifth level $i_5$, activating more resistive elements, the total of which is represented by $R_5$. This results in the temperature of system 100 reaching target temperature ($T_{target}$) and stabilizing at a final temperature ($T_{final}$), which may be slightly higher than $T_{target}$. The current and number of activated resistive elements of heater 102 are then held at $i_5$ and $R_5$, respectively, while the measured relative humidity of system 100 is compared with the boundary condition in operation 316, and the calibration factor is determined when the measured relative humidity is at or above the boundary condition (operation 318).

In each instance in which the current and number of resistive elements activated in heater 102 is changed, such change may be controlled by heater controller 106 in response to instructions from processor 108, which instructions are based on the most recent temperature measurement from sensor 104. Since the number of resistive elements 200-213 that are activated and the amount of current increase in each iteration is determined by the most recent temperature measurement, such number may be the same or different in each iteration. Moreover, although FIG. 5 depicts five iterations, the number of iterations may vary depending on the properties of system 100, as well as other considerations.

Various examples of systems, e.g., humidity sensor devices, on which low power, rapid response on-device heaters are used in connection with a calibration process for the systems are provided. The calibration process may be carried out to reduce or minimize heater response time and/or heater power consumption, and to provide more accurate relative humidity (RH) measurements. In some examples, temperature of the device is accurately measured and monitored and such information is used to efficiently activate the heating elements (e.g., resistors). In some examples, the minimum number of heating elements are activated based on measured temperature to achieve the target temperature or target temperature range. In some examples, the heating elements are activated to rapidly elevate the temperature of device to the target temperature or range. In some examples, once the target temperature is reached, the temperature of the device is stably and reliably maintained to improve accuracy of calibration process for the device (e.g., a humidity sensor).

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of: a device element, a circuit element, an integrated circuit, a device or other electronic or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors in the heater is described herein, other transistors (or equivalent components) may be used instead. For example, a p-type MOSFET may be used in place of an n-type MOSFET with little or no changes to the circuit. Furthermore, other types of components with equivalent functionality may be used. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications of the described examples are possible, as are other examples, within the scope of the claims. Moreover, features described herein may be applied in other environments and applications consist with the teachings provided.

What is claimed is:

1. A system comprising:
   a sensor device including a temperature sensor and a relative humidity sensor;
   a heater coupled to the sensor device;
   a processor coupled to the sensor device and the heater, the processor configured to:
   start a calibration process for the system; and
   receive a relative humidity measurement from the relative humidity sensor; and
   a comparator coupled to the processor, the comparator configured to compare the relative humidity measurement to a threshold and provide a comparison result;
   wherein the processor is further configured to determine whether to continue or abort the calibration process based on the comparison result.

2. The system of claim 1, wherein the comparison result is that the relative humidity measurement exceeds the threshold, responsive to which the processor is configured to continue the calibration process.

3. The system of claim 1, wherein the comparison result is that the relative humidity measurement is less than the threshold, responsive to which the processor is configured to abort the calibration process.

4. The system of claim 1, further comprising:
   a memory coupled to the processor, the memory configurable to store the relative humidity measurement and the threshold.

5. The system of claim 4, wherein the memory is configurable to store executable instructions, and the processor is configured to execute the instructions to start the calibration process, receive the relative humidity measurement, and determine whether to continue or abort based on the comparison result.

6. The system of claim 1, wherein the threshold corresponds to a predetermined operating region for the system.

7. The system of claim 1, wherein the processor is configured to:

receive a temperature measurement from the temperature sensor; and wherein the comparator is configured to compare the relative humidity measurement to the threshold and provide the comparison result when the temperature measurement exceeds a temperature threshold.

8. The system of claim 7, wherein the heater includes an array of resistive elements.

9. The system of claim 8, wherein the resistive elements are individually controllable.

10. The system of claim 9, wherein the temperature measurement is a first temperature measurement, and the processor is configured to:

activate one or more of the resistive elements;

receive a second temperature measurement from the temperature sensor; and activate one or more additional resistive elements responsive to the second temperature measurement being less than the temperature threshold.

11. A system comprising:

a sensor device including a temperature sensor and a relative humidity sensor;

a heater coupled to the sensor device, the heater including individually controllable heating elements;

a processor coupled to the sensor device and the heater, the processor configured to:

start a calibration process for the system;

receive a relative humidity measurement from the relative humidity sensor and a plurality of temperature measurements from the temperature sensor; and activate one or more of the heating elements responsive to at least one of the temperature measurements being less than a temperature threshold; and a comparator coupled to the processor, the comparator configured to compare the relative humidity measurement to a relative humidity threshold responsive to one of the temperature measurements exceeding the temperature threshold;

wherein the processor is further configured to determine whether to continue or abort the calibration process based on a result of the comparing.

12. The system of claim 11, wherein the comparison result is that the relative humidity measurement exceeds the threshold, responsive to which the processor is configured to continue the calibration process.

13. The system of claim 11, wherein the comparison result is that the relative humidity measurement is less than the threshold, responsive to which the processor is configured to abort the calibration process.

14. The system of claim 11, further comprising:

a memory coupled to the processor, the memory configurable to store the relative humidity measurement and the threshold.

15. The system of claim 10, wherein the threshold corresponds to a predetermined operating region for the system.

16. The system of claim 15, wherein the memory is configurable to store executable instructions, and the processor is configured to execute the instructions to start the calibration process, receive the relative humidity measurement, and determine whether to continue or abort based on the comparison result.

17. The system of claim 16, wherein the heater includes an array of resistive elements.

18. The system of claim 17, wherein the resistive elements are individually controllable.

19. A system comprising:

a sensor device including a temperature sensor and a relative humidity sensor;

a heater coupled to the sensor device, the heater comprising:

an array of resistors, each resistor including a first terminal and a second terminal, the first terminals of the resistors of the array of resistors coupled to a first voltage terminal; and an array of transistors, each transistor including a first current terminal, a second current terminal, and a control terminal, the respective first current terminals of the array of transistors coupled to the respective second terminals of the resistors of the array of resistors, and the second current terminals of the array of transistors coupled to a second voltage terminal;

a processor coupled to the sensor device and coupled to the control terminals of the transistors of the array of transistors, the processor configured to:

start a calibration process for the system;

receive a relative humidity measurement from the relative humidity sensor and a plurality of temperature measurements from the temperature sensor; and activate one or more of the transistors responsive to at least one of the temperature measurements being less than a temperature threshold; and a comparator coupled to the processor, the comparator configured to compare the relative humidity measurement to a relative humidity threshold responsive to one of the temperature measurements exceeding the temperature threshold;

wherein the processor is further configured to determine whether to continue or abort the calibration process based on a result of the comparing.

20. The system of claim 19, further comprising: a memory coupled to the processor, wherein the memory is configurable to store executable instructions, and the processor is configured to execute the instructions to start the calibration process, receive the relative humidity measurement, and determine whether to continue or abort based on the comparison result.

* * * * *